Sept. 26, 1933.　　　　　H. DE JUR　　　　　1,928,310
FRICTION REDUCTION OR VERNIER DRIVE MECHANISM
Filed June 17, 1932
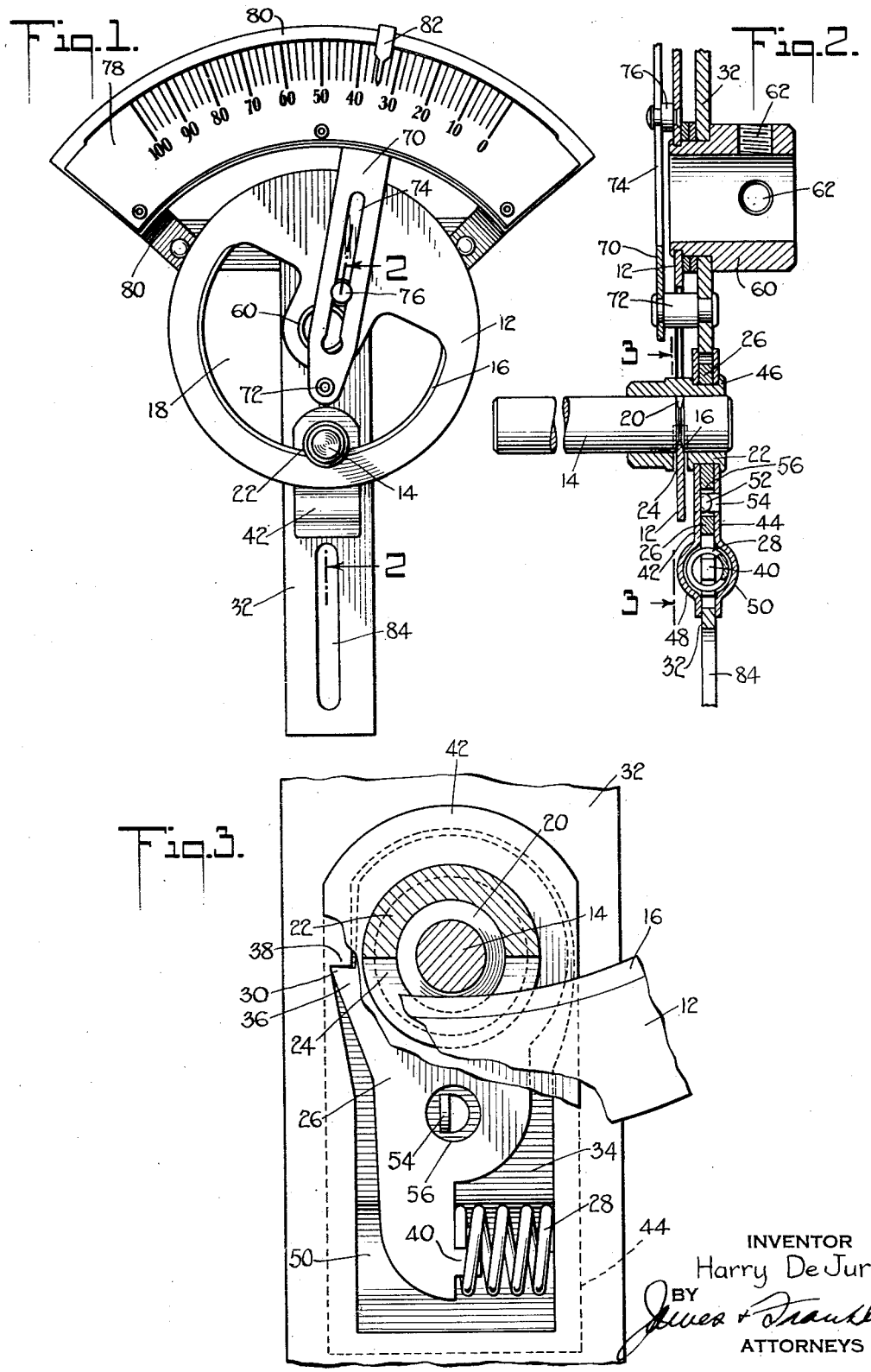
INVENTOR
Harry DeJur
BY
ATTORNEYS Patented Sept. 26, 1933

1,928,310

UNITED STATES PATENT OFFICE 1,928,310

FRICTION REDUCTION OR VERNIER DRIVE MECHANISM

Harry De Jur, New York, N. Y., assignor to De Jur-Amsco Corporation, New York, N. Y., a corporation of New York Application June 17, 1932. Serial No. 617,770

8 Claims. (Cl. 74—7)

This invention relates to friction reduction or vernier drive mechanism for the accurate control of adjustable instruments, particularly variable condensers of radio receivers and the like.

The primary and general object of the present invention resides in the provision of improved reduction drive or control mechanism of the frictionally driven type.

More specifically, some of the objects of the present invention center about the mechanism for bringing the drive shaft and the disc driven thereby into yieldable frictional engagement, and are, first, to apply the yieldable or resilient force through lever mechanism, providing a substantial mechanical advantage; secondly, to permit the use of a longer or/and lighter spring for obtaining the desired frictional contact; and thirdly, to thereby improve the smoothness and evenness of operation of the resulting drive mechanism.

A further object of the present invention is to so design the aforesaid drive mechanism that all of the parts thereof will be either simple sheet metal stampings, or simple cylindrical or turned parts, thereby avoiding the necessity for using relatively expensive die castings or similar elements. Other and more detailed objects of the present invention are to completely conceal the working parts of the aforesaid mechanism against dust and dirt, and to improve the appearance of the finished unit.

To the accomplishment of the foregoing and such other objects as may hereinafter appear, my invention consists in the friction reduction drive elements and their relation one to the other, as hereinafter are more particularly described in the specification and sought to be defined in the claims. The specification is accompanied by a drawing, in which:

Fig. 1 is a front elevation of tuning condenser dial mechanism embodying features of my invention;

Fig. 2 is an enlarged section taken in the plane of the line 2—2 in Fig. 1; and

Fig. 3 is an enlarged section taken in the plane of the line 3—3 in Fig. 2.

Referring to the drawing, the invention as here illustrated comprises a main drive disc 12 and a vernier drive shaft 14 for adjusting the position of disc 12. The disc 12 is preferably provided with a beveled peripheral edge 16 which in this case is located internally of the disc and is formed by cutting away a large arcuate section 18 of the disc, as is clearly evident from an inspection of Fig. 1 of the drawing. The drive shaft 14 is provided with a generally V-shaped groove 20 for receiving and frictionally engaging the beveled edge 16 of disc 12.

In order to provide a dependable driving engagement between disc 12 and shaft 14 with a uniform amount of frictional resistance even over a long and extended period of use, it is essential that the disc 12 and shaft 14 be yieldably urged into frictional engagement. In accordance with my invention this is accomplished by mounting shaft 14 in a movable bearing or bushing 22 which may be and preferably is transversely slotted, as is indicated at 24, in order to permit access of the disc edge 16 to the groove 20 while supporting the shaft 14 on both sides of the disc. The movable bushing 22 is carried by a lever 26 which in turn is acted upon by resilient means here exemplified by the compression spring 28. The lever 26 is fulcrumed at 30, this fulcrum being so located with respect to the bushing 22 and the resilient means 28 as to gain a substantial mechanical advantage.

In the particular case here shown, it will be evident from inspection of Fig. 3 that the compression spring 28 tends to oscillate the depending lever 26 in a clockwise direction about the fulcrum 30, which in turn causes a downward movement of bushing 22 about the fulcrum 30, thereby bringing the generally V-shaped groove 20 into forcible frictional engagement with the beveled edge 16 of disc 12.

For the sake of compactness and with a view to localizing the application of force to bushing 22 at a point near the groove 20, the lever mechanism 26 is preferably made co-planar with and housed directly within the main support or bracket 32 of the drive mechanism. To this end the bracket 32 is cut away for considerable area, as is indicated at 34 in Fig. 3, and the lever 26 is positioned in the cut-away area 34. The fulcrum at point 30 is provided in a relatively simple manner by forming a lug 36 on lever 26 and a mating recess or abutment surface 38 in the bracket 32. The lower or depending end of lever 26 may be provided with a horizontally extending projection 40 for anchoring the spring 28 properly in place.

In order to more securely fix the location of lever 26 in bracket 32, and with the further objects of providing a dust-proof enclosure for the mechanism so far described, and of greatly enhancing the finished appearance of the unit, there may be added to the mechanism so far described a pair of cover plates 42 and 44. These cover plates may, if desired, be secured to the bracket 32, but in the present case they are more simply mounted in place by securing the same to the movable bushing 22. The cover plates 42 and 44 are movable rather than fixed, but, of course, their movement, like the movement of lever 26 and drive shaft 4, is very slight indeed. The cover plates 42 and 44 are locked on bushing 22 together with the lever 26 in a manner clearly evident from an inspection of Fig. 2, these elements being forced over bushing 22, and the rear edge of the latter being riveted or swaged outwardly, as is indicated at 46. The bottom portions of cover plates 42 and 44 are preferably bent outwardly, as is indicated at 48 and 50 in Fig. 2, so as to encompass the spring 28. If desired, a lug 52 may be struck inwardly from cover plate 42, and a lug 54 may be struck inwardly from cover plate 44, the lugs 52 and 54 entering a hole 56 formed in the lever 26. Clearance between the lugs 52 and 54 and the hole 56 may or may not be provided, as desired, for, as before explained, there is no objection to movement of the cover plates with the lever.

The trim and workman-like appearance given to the unit by the use of the cover plates is quite evident from an inspection of Fig. 1 showing the front cover plate 42.

The particular reduction drive unit here shown is especially designed for use with the tuning condenser system of radio receivers and the like. For this purpose the main drive disc 12 is fixedly secured to a bushing or collar 60 provided with one or more set screws 62 for locking the bushing 60 to one end of the condenser shaft. The bushing 60 is rotatably carried by the support or bracket 32 and thereby forms the desired bearing for rotation of the disc 12.

The position of adjustment of the condenser or other instrument being controlled by the friction drive may be indicated by any desired form of pointer or indicator secured, for example, directly to the oscillatable disc 12. However, in order to make available a full vision dial or indicator scale having enlarged and clearly readable graduations, I prefer to use the indicator mechanism shown in Figs. 1 and 2. This indicator mechanism comprises an indicator arm 70 pivoted on a rigid stud 72 located independently of and preferably below the bushing or bearing 60 of the main drive disc. The indicator arm 70 is slotted as shown at 74, and the drive disc 12 is provided with a crank pin 76 which passes through the slot 74. It will be evident from an inspection of Fig. 1 that upon rotation of the disc 12 the indicator arm 70 is caused to oscillate.

The position of the indicator arm is determined with reference to a scale 78 which preferably consists of an arcuate strip of translucent celluloid or the like bent into the shape of a sector of the frustrum of a cone and rigidly supported in desired position by a metallic framework 80 itself secured to the upper end of the generally upright bracket 32. The lower edge of scale 78 is positioned on top of the frame 80 and is riveted thereto, as shown, while the upper edge of the scale 78 preferably is positioned behind the frame 80. The upper end of indicator arm 70 is provided with a pointer 82 which comes from behind the scale 78 and is bent downwardly for cooperation with the graduations on the scale.

As will be readily understood by those familiar with this art, the indicator arm 70 may be provided with a small lamp housing and lamp at a point behind the scale 78, thereby illuminating the portion of the scale at which the pointer 82 is located.

It will be understood that in actual use the bushing 60 is secured to the shaft of the condenser or other adjustable instrument, while the bracket 32 is held against transverse movement by any appropriate anchorage passing through an aperture such as the elongated slot 84. The bracket may be rigidly mounted in place, if desired, or may simply be floatingly mounted on the condenser shaft at one end, and at the slot 84 at its other end.

It is believed that the mode of constructing and using, and the many advantages of my improved frictional reduction drive mechanism, will, for the most part, be apparent from the foregoing detailed description. The frictional engagement between the drive shaft and the disc is assured and kept at a uniform value because the spring pressure is applied through leverage mechanism gaining a very substantial mechanical advantage. This permits the use of a more yieldable or less rigid spring, and in general insures a very smooth and even action of the control mechanism. The frictional resistance of the drive may be adjusted to a desired value, and this value remains practically unchanged over extended periods of use.

It will be noted from an inspection of the drawing, that all of the parts of the drive mechanism consist either of simple sheet metal stampings or generally cylindrical parts (specifically, the drive shaft 14, the bushings 22 and 60, the stud 72, and the crank pin 76) which cylindrical parts may be made by simple turning processes. No parts of irregular configuration requiring die casting or the like are needed. The working parts of the friction drive mechanism are fully enclosed and concealed and protected against dust or dirt which might cause excessive wear.

It will be evident that this frictional drive may be applied to the external periphery of a disc as well as the internal periphery as here illustrated. It will also be evident that the drive shown may be used with other types of indicator mechanism than that here specified, although the latter indicator mechanism is a preferred and highly desirable construction. It will be apparent that while I have shown and described my invention in preferred form, many changes and modifications may be made in the structure disclosed, without departing from the spirit of the invention, defined in the following claims.

I claim:

1. Friction reduction or vernier drive mechanism comprising a main drive disc, a drive shaft having driving means for engaging the drive disc, a movable bearing for said shaft, and means for yieldably forcing said bearing and shaft toward the peripheral edge of the disc including a lever carrying the bearing and resilient means tending to oscillate said lever about a fulcrum so located as to gain a substantial mechanical advantage.

2. Friction reduction or vernier drive mechanism comprising a main drive disc having a beveled peripheral edge, a drive shaft having a generally V-shaped groove cut therein, a movable bearing for said shaft, and means for yieldably forcing said bearing and shaft toward the peripheral edge of the disc including a lever carrying the bearing and resilient means tending to oscillate said lever, said lever being so pivoted relative to the movable bearing carried thereby and the resilient means actuating the same as to tend to force the groove of the drive shaft into frictional engagement with the beveled edge of the drive disc with a substantial mechanical advantage.

3. Friction reduction or vernier drive mechanism for adjustable instruments comprising a support or bracket, a main drive disc and collar fixed thereto rotatably supported on said bracket, a manually operable drive shaft having a groove cut therein for frictionally engaging the periphery of the drive disc, a movable bushing or bearing for carrying said drive shaft, said bushing being transversely slotted adjacent the aforesaid groove to permit the groove to be brought into engagement with the disc, said bracket being cut away to form an open space for receiving a lever one end of which carries the slotted bushing, a spring arranged to bear against the other end of said lever, and a lug projecting from one side of the lever near the bushing and engaging a mating slot in the support, thereby forming a fulcrum causing the spring to urge the drive shaft into frictional engagement with the disc with a substantial mechanical advantage.

4. Friction reduction or vernier drive mechanism for adjustable instruments comprising a support or bracket, a main drive disc rotatably supported on said bracket, said drive disc being cut away to form an arcuate internal periphery, a manually operable drive shaft having a groove cut therein for frictionally engaging the aforesaid periphery of the drive disc, a movable bushing or bearing for carrying said drive shaft, said bushing being transversely slotted adjacent the aforesaid groove to permit the groove to be brought into engagement with the disc, a lever carrying the slotted bushing and a spring arranged to oscillate said level about a fulcrum so located as to gain a substantial mechanical advantage.

5. Friction reduction or vernier drive mechanism for adjustable instruments comprising a support or bracket, a main drive disc and collar fixed thereto rotatably supported on said bracket, said drive disc being cut away to form an arcuate internal periphery, a manually operable drive shaft having a groove cut therein for frictionally engaging the aforesaid periphery of the drive disc, a movable bushing or bearing for carrying said drive shaft, said bracket being cut away to form an open space for receiving a lever one end of which carries the bushing, a spring arranged to bear against the other end of said lever, and a lug projecting from one side of the lever near the bushing and engaging a mating slot in the support, thereby forming a fulcrum causing the spring to urge the drive shaft into frictional engagement with the disc with a substantial mechanical advantage.

6. Friction reduction or vernier drive mechanism for adjustable instruments comprising a generally upright support or bracket, a main drive disc and collar fixed thereto rotatably supported on said bracket, said drive disc being cut away to form an arcuate internal periphery, the edge of said periphery being beveled, a manually operable drive shaft having a generally V-shaped groove cut therein for frictionally engaging the aforesaid beveled periphery of the drive disc, a movable bushing or bearing for carrying said drive shaft, said bushing being transversely slotted adjacent the aforesaid groove to permit the groove to be brought into engagement with the disc, said upright bracket being cut away to form an open space for receiving a lever the upper end of which carries the slotted bushing, a compression spring arranged to bear against the depending lower end of said lever, and a lug projecting from one side of the lever near the upper end thereof and engaging a mating slot in the upright support, thereby forming a fulcrum causing the compression spring to urge the drive shaft into frictional engagement with the disc with a substantial mechanical advantage, and cover plates located on opposite faces of the upright bracket and secured to the slotted bushing for enclosing the aforesaid spring and lever mechanism.

7. Friction reduction or vernier drive mechanism comprising a main drive disc, a drive shaft having driving means for engaging the drive disc, a movable bearing for said shaft, means for yieldably forcing said bearing and shaft toward an edge of the disc including a lever carrying the bearing and resilient means tending to oscillate said lever about a fulcrum so located as to gain a substantial mechanical advantage, an arcuate indicator scale, a longitudinally slotted indicator arm pivoted independently of the main drive disc, a crank pin on said drive disc projecting through said slot, and a pointer mounted on said arm and cooperating with said scale.

8. Friction reduction or vernier control mechanism for adjustable instruments comprising a generally upright bracket, an arcuate indicator scale mounted at the upper end of said bracket, a main drive disc mounted on said bracket below said scale, a longitudinally slotted indicator arm pivoted independently of the bearing for the drive disc, a crank pin on said drive disc projecting through said slot for oscillating the indicator arm during rotation of the drive disc, a pointer mounted on said indicator arm and cooperating with said arcuate scale, and a drive shaft yieldably urged into frictional engagement with the drive disc for causing rotation of the same.

HARRY DE JUR.